US007036028B2

(12) United States Patent
Zalesski

(10) Patent No.: US 7,036,028 B2
(45) Date of Patent: Apr. 25, 2006

(54) POWER MANAGEMENT SYSTEM INCLUDING A VARIABLE VOLTAGE LINK

(75) Inventor: George Zalesski, Vestal, NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 269 days.

(21) Appl. No.: 10/249,855

(22) Filed: May 13, 2003

(65) Prior Publication Data

US 2004/0230844 A1 Nov. 18, 2004

(51) Int. Cl.
*G06F 1/32* (2006.01)

(52) U.S. Cl. ...................... 713/320; 713/300; 713/323; 713/340

(58) Field of Classification Search ................ 713/300, 713/323, 340, 320
See application file for complete search history.

(56) References Cited

U.S. PATENT DOCUMENTS 5,752,046 A * 5/1998 Oprescu et al. ............. 713/300
5,760,637 A * 6/1998 Wong et al. ................ 327/536
5,828,201 A 10/1998 Hoffman, Jr. et al.
5,869,950 A 2/1999 Hoffman, Jr. et al.
6,101,611 A * 8/2000 Yoshida ...................... 713/340
6,140,800 A 10/2000 Peterson
6,433,618 B1 * 8/2002 Bertin et al. ................ 327/534
6,566,935 B1 * 5/2003 Renous ....................... 327/408
6,915,185 B1 * 7/2005 Yamamoto et al. ......... 700/286
2001/0052810 A1 * 12/2001 Rolandi et al. ............. 327/534
2002/0128690 A1 * 9/2002 Zarinetchi .................... 607/33
2004/0151304 A1 * 8/2004 George et al. .............. 379/413
2004/0155174 A1 * 8/2004 Wu et al. ................... 250/205

OTHER PUBLICATIONS

SEMTECH “Hysteretic Controller”, Mar. 1, 2000.

* cited by examiner

*Primary Examiner*—Thomas Lee
*Assistant Examiner*—Vincent Tran
(74) *Attorney, Agent, or Firm*—Charles L. Moore; Geoffrey H. Krauss

(57) ABSTRACT

A power management system and method of operation is disclosed. The power management system may include a controller associated with each load or subsystem of a plurality of loads or subsystems to determine a lowest operational voltage based on an operating point of the associated load or subsystem. The power management system may further include a voltage link to supply a highest voltage of the lowest operational voltages.

31 Claims, 2 Drawing Sheets

POWER MANAGEMENT COMPUTER
102
108
ENERGY SOURCE/STORAGE MODULE
104
POWER SOURCE(S)/ ENERGY STORAGE UNIT(S)
116
VARIABLE FREQUENCY POWER CONVERTER
114
CONTROLLER
112
110
SUBSYSTEM 1
106
LOAD 1
122
120
VARIABLE FREQUENCY POWER CONVERTER
CONTROLLER
118
EFFICIENCY MAPPING DATA
124
100
SUBSYSTEM N
106
LOAD N
122
120
VARIABLE FREQUENCY POWER CONVERTER
CONTROLLER
118
EFFICIENCY MAPPING DATA
124

POWER MANAGEMENT COMPUTER
102
104
ENERGY SOURCE/STORAGE MODULE
POWER SOURCE(S)/ ENERGY STORAGE UNIT(S)
116
108
VARIABLE FREQUENCY POWER CONVERTER
114
CONTROLLER
112
110
SUBSYSTEM 1
106
LOAD 1
122
120
VARIABLE FREQUENCY POWER CONVERTER
100
CONTROLLER
118
EFFICIENCY MAPPING DATA
124
SUBSYSTEM N
106
LOAD N
122
120
VARIABLE FREQUENCY POWER CONVERTER
CONTROLLER
118
EFFICIENCY MAPPING DATA
124

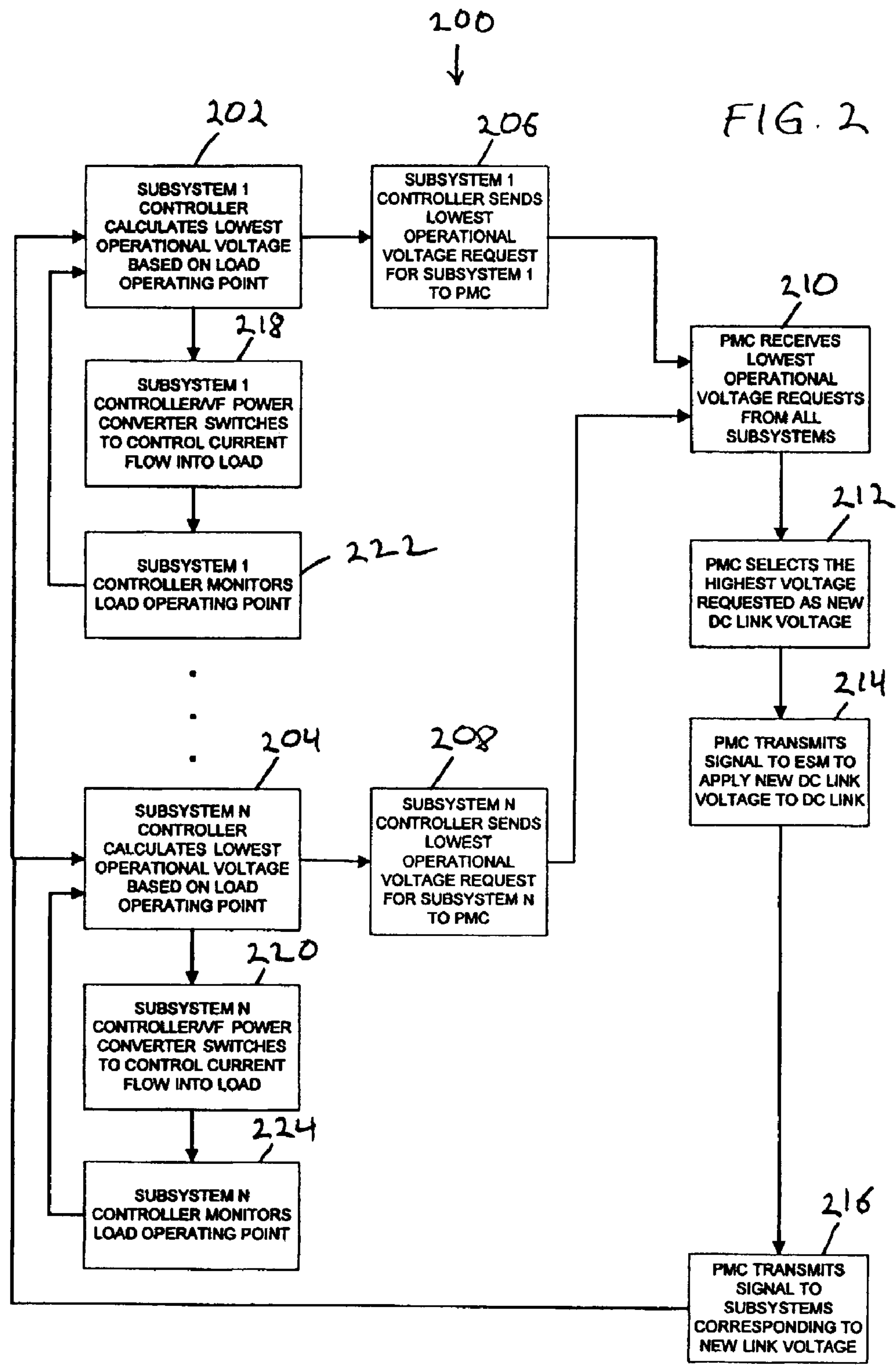

200
FIG. 2
202
SUBSYSTEM 1 CONTROLLER CALCULATES LOWEST OPERATIONAL VOLTAGE BASED ON LOAD OPERATING POINT
206
SUBSYSTEM 1 CONTROLLER SENDS LOWEST OPERATIONAL VOLTAGE REQUEST FOR SUBSYSTEM 1 TO PMC
218
SUBSYSTEM 1 CONTROLLER/VF POWER CONVERTER SWITCHES TO CONTROL CURRENT FLOW INTO LOAD
222
SUBSYSTEM 1 CONTROLLER MONITORS LOAD OPERATING POINT
210
PMC RECEIVES LOWEST OPERATIONAL VOLTAGE REQUESTS FROM ALL SUBSYSTEMS
212
PMC SELECTS THE HIGHEST VOLTAGE REQUESTED AS NEW DC LINK VOLTAGE
214
PMC TRANSMITS SIGNAL TO ESM TO APPLY NEW DC LINK VOLTAGE TO DC LINK
204
SUBSYSTEM N CONTROLLER CALCULATES LOWEST OPERATIONAL VOLTAGE BASED ON LOAD OPERATING POINT
208
SUBSYSTEM N CONTROLLER SENDS LOWEST OPERATIONAL VOLTAGE REQUEST FOR SUBSYSTEM N TO PMC
220
SUBSYSTEM N CONTROLLER/VF POWER CONVERTER SWITCHES TO CONTROL CURRENT FLOW INTO LOAD
224
SUBSYSTEM N CONTROLLER MONITORS LOAD OPERATING POINT
216
PMC TRANSMITS SIGNAL TO SUBSYSTEMS CORRESPONDING TO NEW LINK VOLTAGE

POWER MANAGEMENT SYSTEM INCLUDING A VARIABLE VOLTAGE LINK

CROSS REFERENCE TO RELATED APPLICATIONS

This application is related to application Ser. No. 10/249,856 filed on the same date as this application, entitled "Energy Storage Modules and Management System" by George Zalesski, assigned to the same assignee as this application and incorporated herein by this reference.

BACKGROUND OF INVENTION

Field of the Invention

The present invention relates to power management, and more particularly to a power management system including a variable voltage link or similar arrangement.

Some electrically powered apparatuses or systems may include multiple loads or subsystems that may be simultaneously supplied power from the same power source or sources. The power sources may be energy storage modules or devices, such as batteries, super capacitors or other types of energy storage devices. The operating points or power demands of each of these multiple loads or subsystems may vary over time and under various load and environmental conditions. If the power source or sources do not supply enough voltage that is required to satisfy power demands for a current operating point of the subsystem, the subsystem may operate inefficiently or fail to accomplish an intended function. Conversely, if the power source or sources supply a higher voltage than is needed by the subsystem with the highest voltage demand, the subsystem may operate inefficiently and energy may be wasted.

Accordingly, there is a need to provide a power management system that can provide a lowest operational voltage on a voltage link that also meets the highest operational voltage request of any subsystem or load supplied by the voltage link. There is also a need to provide a power management system that continually monitors or determines a lowest operational voltage request or requirement for each subsystem or load and continuously varies the voltage on the voltage link to supply the highest voltage requested from any one of the subsystems or loads.

SUMMARY OF INVENTION

In accordance with an embodiment of the present invention, a power management system may include a controller associated with each load or subsystem of a plurality of loads or subsystems to determine a lowest operational voltage based on an operating point of the associated load or subsystem. A voltage link to supply a highest voltage of the lowest operational voltages.

In accordance with another embodiment of the present invention, a power management system may include a voltage link to supply power to each of a plurality of loads or subsystems. A power management computer may control or select a magnitude of voltage applied to the voltage link. A controller associated with each load or subsystem of the plurality of loads or subsystems may send a voltage request signal to the power management computer. The voltage request signal may correspond to a request for a lowest operational voltage based on an operating point of the associated load or subsystem.

In accordance with another embodiment of the present invention, a method to manage power applied to each of a plurality of subsystems or loads may include sending a lowest operational voltage request from each subsystem or load of the plurality of subsystems or loads to a power management computer. A highest one of the lowest operational voltage requests may be selected as a link voltage.

In accordance with another embodiment of the present invention, a method to manage power applied to each of a plurality of subsystems may include calculating or determining a lowest operational voltage for each subsystem based on a load operating point. A lowest operational voltage request may be sent from each subsystem to a power management computer.

BRIEF DESCRIPTION OF DRAWINGS

FIG. 2 is a flow chart of a method to manage power applied to a subsystem or load or a plurality of subsystems or loads.

DETAILED DESCRIPTION

Figure 1:
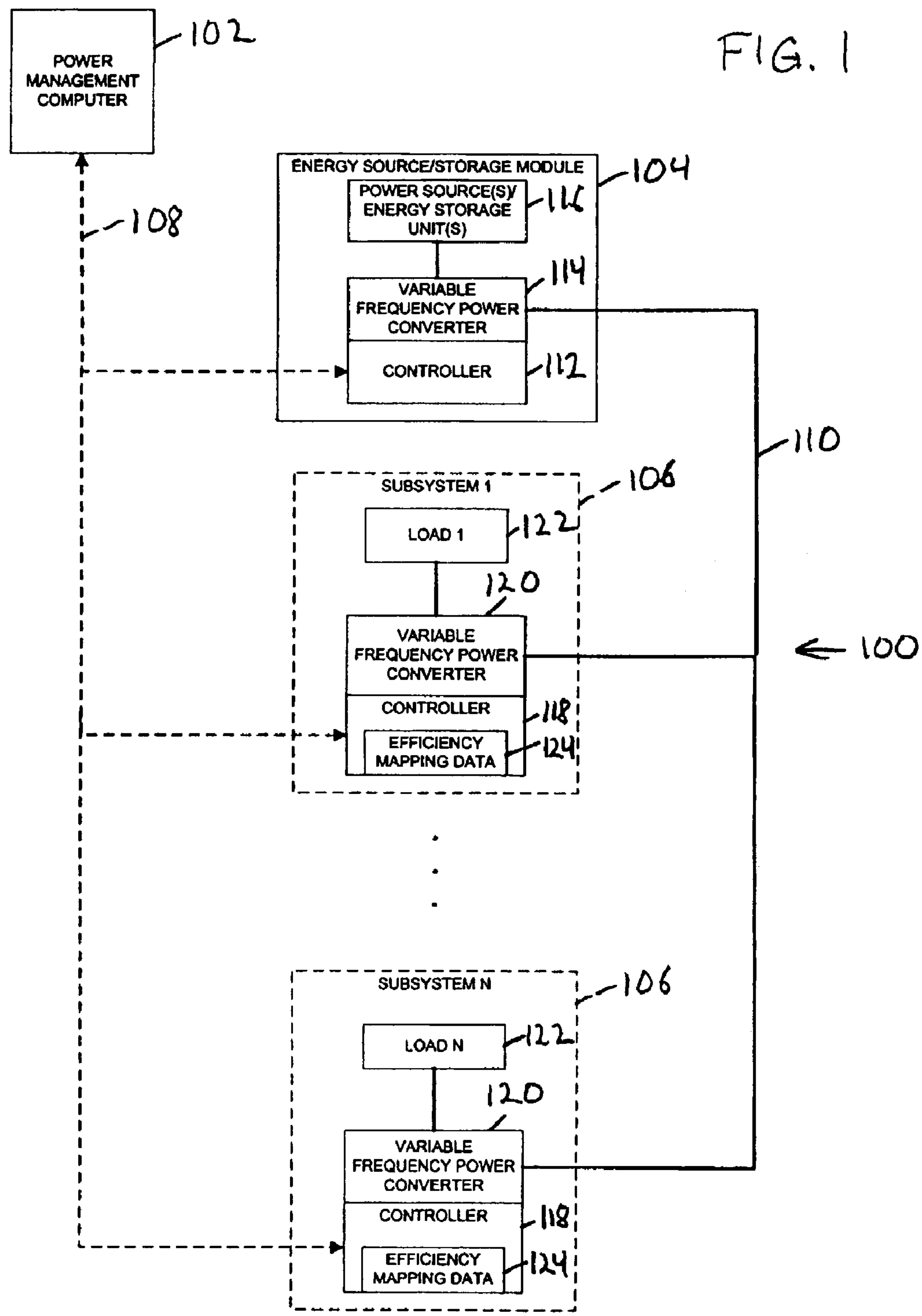
FIG. 1 is a block diagram of a power management system in accordance with an embodiment of the present invention.

The following detailed description of preferred embodiments' refers to the accompanying drawings which illustrate specific embodiments of the invention. Other embodiments having different structures and operations do not depart from the scope of the present invention.

FIG. 1 is a block diagram of a power management system 100 in accordance with an embodiment of the present invention. The system 100 may include a power management computer 102. The power management computer 100 may be coupled to an energy source 104 and a plurality of subsystems 106 by a local area network (LAN) 108 or similar communications network. The energy source 104 may be an energy storage module or the like. The energy source 104 or energy storage module may be connected to each of the subsystems 106 by a voltage link 110 or variable voltage link. The system 100 may include a plurality of energy sources 104 or energy storage modules coupled to the voltage link 110. The voltage link 110 is illustrated by a solid line in FIG. 1 to connote electrical power distribution, while the LAN 108 is illustrated by a broken or dashed line to connote data communications.

The voltage link 110 may be a direct current (DC) variable voltage link for some applications. For example, the subsystems 106 may include a load that is a traction motor or similar apparatus that operates at varying speeds in response to the magnitude of a DC voltage applied to the motor.

The energy source or energy storage module 104 may include a controller 112. The controller 112 may be connected to the power management computer 102 by the LAN 108 to send and receive information or instructions. The controller 112 may receive instructions from the power management computer 102 to control operation of a variable frequency power converter 114. The variable frequency power converter 114 may connect a power source or sources 116 to the voltage link 110. The power source 116 may be one or more energy storage units, such as a battery, capacitor, pulse power generator, flywheel, or similar power source or energy storage unit The controller 112 may control the variable frequency power converter 114 to select a link voltage to be applied to the voltage link 110. The link voltage may be varied in response to voltage requests from the subsystems 106 via the LAN 108, as will be described in more detail below. An example of an energy storage module 104 is described in U.S. patent application Ser. No. 10/249,856, entitled "Energy Storage Modules and Management System" which is incorporated herein by reference as indicated above.

The controller 112 may be a microprocessor, application specific integrated circuit (ASIC) or similar device. The variable frequency power converter 114 may be a variable voltage bidirectional converter, as described in U.S. patent application Ser. No. 10/249,856, entitled "Energy Storage Modules and Management System". The function of the controller 112 and variable frequency power converter 114 may also be integrated into a single ASIC or semiconductor device.

Each subsystem 106 may include a controller 118 to send and receive information or data over the LAN 108 from the power management computer 102 and to control operation of a variable frequency power converter 120 associated with the controller 118. The variable frequency power converter 120 may be connected to a load 122. The variable frequency power converter 120 under control of the controller 118 may control the power applied to the load 122 in response to an operational voltage requested by the controller 118 and a magnitude of the link voltage on the voltage link 110. The variable frequency power converter 120 under control of the controller 118 may alternately connect and disconnect the voltage link 110 to and from the load 122 to control the current flowing into the load 122. The variable frequency power converter 120 may alternately connect and disconnect the voltage link 110 to the load 122 at a predetermined frequency that may vary as a function of a link voltage on the voltage link 100 and an operating point of the load 122. Converters, such as variable frequency power converter 120, may reduce the frequency as the voltage on the voltage link 110 decreases. An example of the variable voltage frequency converter 120 may be a hysteretic controller; although any device that can perform the functions described above may be used as well.

The controller 118 may be a microprocessor, application specific integrated circuit (ASIC) or similar device. The variable frequency power converter 120 may also be an ASIC or similar device capable of handling the magnitude of power requested by the associated load 122. The function of the controller 118 and variable frequency power converter 120 may also be integrated into a single ASIC or semiconductor device. Each controller 118 may include efficiency mapping data 124 to determine a lowest operational voltage based on a current operating point of an associated one of the plurality of loads 122.

FIG. 2 is a flow chart of a method 200 to manage power applied to a subsystem or load or a plurality of subsystems or loads similar to subsystems 106 and loads 122 of FIG. 1. The method 200 may be performed by the power management system 100 of FIG. 1. In blocks 202 and 204, a controller for each subsystem 1-N may calculate a lowest operational voltage based on a current load operating point of the subsystems or loads. The controller may be similar to controller 118 of FIG. 1. The controller for each subsystem 1-N may send a lowest voltage request signal to a power management computer (PMC) in blocks 206 and 208. The PMC may be similar to power management computer 102 in FIG. 1. In block 210, the power management computer may receive the voltage requests, and in block 212, the power management computer may select the highest voltage of the lowest voltage requests as a new link voltage. In block 214, the power management computer may transmit a signal to an energy storage module, similar to energy storage module 104 of FIG. 1. The power management computer may also transmit a signal to the controller at each subsystem to advise each subsystem of the new link voltage in block 216.

In blocks 218 and 220, the controller and variable frequency power converter, such as controller 118 and variable frequency power converter 120 of FIG. 1, of each subsystem 1-N may switch to control current flow into the respective subsystem's load from the voltage link 110 (FIG. 1). For optimal operation of the power management system, the link voltage may be kept as low as needed to supply power to the subsystem 1-N requesting the highest operational voltage. The lower the link voltage, the lower the switching frequency of the variable frequency power converters to control the flow of current into the respective loads in response to the operating point of the load. The lowest link voltage may also mean a lower loss of energy or less wasted energy or power as a result of the power management system.

In blocks 222 and 224, the controller, such as controller 118 of FIG. 1, of each subsystem 1-N, such as subsystems 106 in FIG. 1, may continuously monitor the operating point of the load 122 associated with the controller 118. If the load operating point changes, a new lowest operational voltage may be calculated or determined in blocks 202 and 204. Each controller may include efficiency mapping data to determine a lowest operational voltage based on an operating point of the associated load. The lowest operational voltage may be calculated such that the controller may sufficiently deliver power to its associated load. Each load may require a different minimum voltage to sufficiently deliver the power to the load. Thus voltage load mapping may provide the minimum voltage to deliver sufficient power to the associated load. The mapping may be unique to every controller. The subsystem controller may send a new lowest voltage request in blocks 206 or 208. The power management computer receives the request or requests in block 210 and may select a new link voltage in response to the highest one of all lowest voltage requests received being higher or lower than the current link voltage.

Although specific embodiments have been illustrated and described herein, those of ordinary skill in the art appreciate that any arrangement which is calculated to achieve the same purpose may be substituted for the specific embodiments shown and that the invention has other applications in other environments. For example, the structure and method of the present invention may be used to power an electric traction system or the like. This application is intended to cover any adaptations or variations of the present invention. The following claims are in no way intended to limit the scope of the invention to the specific embodiments described herein.

The invention claimed is:

1. A power management system, comprising:

a controller associated with each load of a plurality of loads to determine a lowest operational voltage based on an operating point of the associated load;

a voltage link to supply a highest voltage of the lowest operational voltages; and a variable frequency power converter associated with each controller, wherein the controller controls the associated variable frequency power converter to apply power from the voltage link to the associated load in response to the operating point of the load, wherein the variable frequency power converter alternately connect and disconnect the voltage link to the load at a predetermined frequency that is a function of a voltage on the voltage link and the operating point of the load.

2. The power management system of claim 1, wherein each controller comprises efficiency mapping data to determine the lowest operational voltage based on the operating point of the associated load.

3. The power management system of claim 1, further comprising a power management computer to receive a lowest operational voltage request from each controller and to select a highest one of the received operational voltage requests as a new link voltage.

4. The power management system of claim 3, further comprising at least one power source to apply the new link voltage to the voltage link in response to a predetermined signal from the power management computer.

5. The power management system of claim 4, wherein the at least one power source comprises an energy storage module.

6. A power management system, comprising:

a controller associated with each load of a plurality of loads to determine a lowest operational voltage based on an operating point of the associated load;

a voltage link to supply a highest voltage of the lowest operational voltages;

a variable frequency power converter associated with each controller, wherein the controller controls the associated variable frequency power converter to apply power from the voltage link to the associated load in response to the operating point of the load;

at least one energy source;

another variable frequency power converter coupled to the at least one energy source; and another controller associated with the variable frequency power converter to control a level of voltage applied to the voltage link by the variable frequency power converter.

7. The power management system of claim 6, wherein the energy source comprises one of a battery, a capacitor, a pulse power generator, or a flywheel.

8. The power management system of claim 6, further comprising: a power management computer to receive a lowest operational voltage request from each controller and to select a highest one of the received operational voltage requests as a new link voltage.

9. The power management system of claim 8, wherein the new link voltage is applied from the at least one energy source to the voltage link in response to a predetermined signal from the power management computer.

10. A power management system, comprising:

a voltage link to supply power to each of a plurality of loads;

a power management computer to control a magnitude of voltage applied to the voltage link;

at least one power source;

a first converter associated with the at least one power source to deliver a level of power at a predetermined voltage to the voltage link;

a first controller associated with the first converter to control the level of power at the predetermined voltage;

a second converter coupleable to the voltage link and associated with each load of the plurality of loads; and a second controller associated with each load of the plurality of loads to determine a lowest operational voltage based on an operating point of the associated load and to control a level of power delivered to the associated load by the second converter associated with the load.

11. The power management system of claim 10, wherein the second controller monitors the operating point of the load to send a signal to the power management computer in response to a new operating point.

12. The power management system of claim 10, wherein the power management computer selects a highest one of a lowest operational voltage from each second controller to be applied to the voltage link.

13. The power management system of claim 12, wherein the level of power delivered to the voltage link corresponds the highest one of the lowest operational voltages from each second controller.

14. The power management system of claim 10, wherein each second converter comprises a variable frequency power converter associated with each second controller, wherein the second controller controls the associated variable frequency power converter to apply power from the voltage link to the associated load in response to the operating point of the load.

15. The power management system of claim 14, wherein the second controller causes the associated variable frequency power converter to alternately connect and disconnect the voltage link to the load to control a current flow into the load.

16. The power management system of claim 15, wherein the variable frequency power converter alternately connects and disconnects the voltage link to the load at a predetermined frequency that is a function of a voltage on the voltage link and the operating point of the load.

17. A method to manage power applied to each of a plurality of subsystems, comprising:

sending a lowest operational voltage request from each subsystem of the plurality of subsystems to a power management computer;

selecting a highest one of the lowest operational voltage requests as a link voltage;

delivering a level of power to a voltage link;

controlling the level of power delivered to the voltage link using a first controller;

delivering another level of power from the voltage link to a load of each subsystem; and controlling the delivery of power from the voltage link to the load of each subsystem using a second controller in response to an operating point of the load.

18. The method of claim 17, further comprising calculating a lowest operational voltage for each subsystem based on a load operating point of each subsystem.

19. The method of claim 17, further comprising alternately connecting and disconnecting a voltage link to a load to control a current flow into the load.

20. The method of claim 19, wherein the voltage link is alternately connected and disconnected to the load at a predetermined frequency that is a function of a voltage on the voltage link and an operating point of the load.

21. The method of claim 17, further comprising monitoring an operating point of a load of each subsystem for any changes.

22. The method of claim 21, further comprising sending a new lowest operational voltage request in response to a change in the operating point of the load of one of the subsystems.

23. The method of claim 22, further comprising applying a new link voltage in response to selecting a new highest one of the lowest operational voltage requests.

24. A method to manage power applied to each of a plurality of subsystems, comprising:

calculating a lowest operational voltage for each subsystem based on a load operating point;

sending a lowest operational voltage request from each subsystem to a power management computer;

controlling the application of power from a voltage link to a load of each subsystem in response to the load operating point; and alternately connecting and disconnecting a voltage link to the load at a predetermined frequency that is a function of a voltage on the voltage link and the load operating point.

25. The method of claim 24, further comprising selecting a highest one of the lowest operational voltage requests as a link voltage.

26. The method of claim 24, further comprising applying a new link voltage in response to a new highest one of the lowest operational voltage requests.

27. A power management system, comprising:

a voltage link;

at least one energy source;

a first converter associated with the at least one power source to deliver a level of power to the voltage link;

a first controller associated with the first converter to control the level of power delivered to the voltage link;

a second converter associated with each load of the plurality of loads to deliver another level of power to each load from the voltage link; and a second controller associated with each second converter to control the other level of power delivered to the associated load by the second converter.

28. The power management system of claim 27, wherein the first converter and each second converter comprise a variable frequency power converter.

29. The power management system of claim 27, further comprising a power management computer to receive a request from each second controller based on a load operating point.

30. The power management system of claim 29, wherein the first controller controls the level of power applied to the voltage link in response to a signal from the power management computer.

31. The power management system of claim 27, wherein the second controller controls the level of power delivered to the associated load based on an operating point of the associated load.

* * * * *

UNITED STATES PATENT AND TRADEMARK OFFICE

CERTIFICATE OF CORRECTION

PATENT NO. : 7,036,028 B2
APPLICATION NO. : 10/249855
DATED : April 25, 2006
INVENTOR(S) : George Zalesski It is certified that error appears in the above-identified patent and that said Letters Patent is hereby corrected as shown below:

Col. 5
line 21, replace "connect" with "connects"
line 22, replace "disconnect" with "disconnects"

Signed and Sealed this

First Day of August, 2006

JON W. DUDAS
*Director of the United States Patent and Trademark Office*